United States Patent
Sun

(10) Patent No.: US 11,669,477 B2
(45) Date of Patent: Jun. 6, 2023

(54) METHOD AND APPARATUS FOR SUPPORTING TCM COMMUNICATION BY BIOS OF ARM SERVER, DEVICE, AND MEDIUM

(71) Applicant: INSPUR SUZHOU INTELLIGENT TECHNOLOGY CO., LTD., Jiangsu (CN)

(72) Inventor: Xiuqiang Sun, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/909,498

(22) PCT Filed: Sep. 28, 2020

(86) PCT No.: PCT/CN2020/118370
§ 371 (c)(1),
(2) Date: Sep. 6, 2022

(87) PCT Pub. No.: WO2021/174826
PCT Pub. Date: Sep. 10, 2021

(65) Prior Publication Data
US 2023/0124740 A1 Apr. 20, 2023

(30) Foreign Application Priority Data
Mar. 5, 2020 (CN) .......................... 202010148301.4

(51) Int. Cl.
*G06F 13/40* (2006.01)
*G06F 5/06* (2006.01)
*G06F 13/16* (2006.01)

(52) U.S. Cl.
CPC ............ *G06F 13/4009* (2013.01); *G06F 5/06* (2013.01); *G06F 13/1684* (2013.01)

(58) Field of Classification Search
CPC ..... G06F 13/4684; G06F 13/4009; G06F 5/06
(Continued)

(56) References Cited

U.S. PATENT DOCUMENTS

| 7,529,946 | B2 * | 5/2009 | Ray ........................ G06F 21/53 713/193 |
| 8,375,221 | B1 * | 2/2013 | Thom ................... G06F 21/552 713/189 |

(Continued)

FOREIGN PATENT DOCUMENTS

| CN | 1687910 A | 10/2005 |
| CN | 1886727 A | 12/2006 |

(Continued)

OTHER PUBLICATIONS

International Search Report cited in PCT application PCT/CN2020/118370, dated Dec. 30, 2020, 7 pages.

(Continued)

*Primary Examiner* — Brian T Misiura
(74) *Attorney, Agent, or Firm* — Cooper Legal Group, LLC

(57) ABSTRACT

A method for supporting TCM communication by a BIOS of an ARM server, including: setting an access mode of a LPC bus device to a 4-byte mode by means of a BIOS of an ARM server; causing the BIOS to perform data communication with a TCM chip of the LPC bus device in the 4-byte mode; in response to the BIOS reading a register by means of the LPC bus device, determining a type of the register; in response to determining that the type of the register is a specific FIFO register, changing a control register from the 4-byte mode to a single-byte mode, and performing single-byte read-write on the specific FIFO register; and in response to completion of read-write of the specific FIFO register, changing the control register to the 4-byte mode by (Continued)

means of the BIOS, and performing a read-write operation on other FIFO registers.

20 Claims, 2 Drawing Sheets

(58) Field of Classification Search
USPC .......................................................... 710/305
See application file for complete search history.

(56) References Cited

U.S. PATENT DOCUMENTS

| | | | | |
|---|---|---|---|---|
| 8,539,458 | B2 * | 9/2013 | Zhu | G06F 8/44 |
| | | | | 712/228 |
| 9,582,413 | B2 * | 2/2017 | Bradbury | G06F 9/34 |
| 2008/0140968 | A1 | 6/2008 | Doshi et al. | |
| 2015/0082063 | A1 | 3/2015 | Peterson et al. | |

FOREIGN PATENT DOCUMENTS

| | | |
|---|---|---|
| CN | 101034373 A | 9/2007 |
| CN | 101281577 A | 10/2008 |
| CN | 101877040 A | 11/2010 |
| CN | 102236747 A | 11/2011 |
| CN | 102375795 A | 3/2012 |
| CN | 102609040 A | 7/2012 |
| CN | 102999453 A | 3/2013 |
| CN | 106127056 A | 11/2016 |
| CN | 106341224 A | 1/2017 |
| CN | 107194257 A | 9/2017 |
| CN | 109614147 A | 4/2019 |
| CN | 110188059 A | 8/2019 |
| CN | 111338997 A | 6/2020 |

OTHER PUBLICATIONS

Written Opinion of International Searching Authority of corresponding PCT application PCT/CN2020/118370, dated Dec. 30, 2020, 9 pages.
First Office Action of corresponding CN priority application CN202010148301.4, dated Jan. 18, 2021, 8 pages.
Sun Bo, Research of TCM Applied on Native Platform, China Doctoral Dissertation Full-Text Database (e-Journal), Aug. 15, 2017, entire document (with unofficial translation of abstract), 74 pages.
Yao Wei-ping, Design and Implementation of Testing System for Trusted Computing Platform, Information Science and Technology Series of China Outstanding Master's Dissertations Full-text Databasec,period3, Mar. 15, 2012, entire document (with translation of abstract), 70 pages.
Wang Yu, et al, Design and implememation of TPM extension and trusted bootstrap on embedded platform, Computer Engineering and Design, May 16, 2009, entire document (with translation of abstract), 4 pages.

* cited by examiner

METHOD AND APPARATUS FOR SUPPORTING TCM COMMUNICATION BY BIOS OF ARM SERVER, DEVICE, AND MEDIUM

This application claims priority to Chinese Patent Application No. 202010148301.4, filed on Mar. 5, 2020, in China National Intellectual Property Administration and entitled "Method and Apparatus for Supporting TCM Communication by BIOS of ARM Server, Device, and Medium", the contents of which are hereby incorporated by reference in its entirety.

FIELD

The present disclosure relates to the field of computer technology, and more particularly to a method and apparatus for supporting Trusted Cryptography Module (TCM) communication by a Basic Input Output System (BIOS) of an Advanced Reduced Instruction Set Computer (RISC) Machine (ARM) server, a device, and a medium.

BACKGROUND

In terms of security strategy, using foreign Trusted Platform Module (TPM) technology will bring China's computer security system under the control of others and keep all information generated in China's future standard computers no secret from foreigners. As a result, we will completely lose the control over information security technologies and the information industry. Therefore, the domestic computer industry and academia have made a common voice of setting up an independent trusted computer technology system and standard. Only when we have an independent trusted computer technology system, a solid foundation may be laid for national information security construction, and it may be ensured that we have the ability and means to protect information technology secrets in the future. Only when we master these key technologies, the core competitiveness of information security in our country may be improved.

Although there is a certain gap between China's information technology and international advanced technology, the research and deployment of trusted computing platforms are almost synchronized in China and other international organizations. Cryptographic technology is the most important core technology in the deployment of a trusted computing system. The specific scheme is to build a security chip, called TCM, based on cryptographic algorithm as the breakthrough point as well as an embedded chip technology by full use of a cryptographic algorithm and engine independently developed in China. It is a trusted computing standard product with completely independent intellectual property rights, which is independently developed according to our cryptographic algorithm. Insiders said China has missed the opportunity to develop Central Processing Units (CPUs) and operating systems with intelligent intellectual property rights, but TCM is the last line of defense for China's information security.

TCM was jointly launched by 12 manufacturers, such as Greatwall, ZTE, Lenovo, Tongfang, Founder, and Sinosun, and is strongly supported by the State Cryptography Administration. It provides basic security service for system platforms and software, and creates a more secure and reliable system platform environment. LPC bus, originally called Low Pin Count bus, is used to connect a low-bandwidth device to a CPU in an IBM Personal Computer (PC) compatible. The LPC bus has the biggest advantage of needing seven signals only, and is easy to lay out on a crowded modern motherboard. The TCM is connected to a domestic Phytium ARM processor through an LPC bus.

Tianjin Phytium Technology Co., Ltd. is a Chinese chip design enterprise using a V8 architecture granted by ARM (Acorn Co., Ltd.), which is mainly committed to the design, production, sales, and service of high-performance and low-power integrated circuit chips in China, thereby providing safe, reliable, high-performance, and low-power CPU chip products for key fields in China.

SUMMARY

In view of this, an objective of embodiments of the present disclosure is to provide a method for supporting TCM communication by a BIOS of an ARM server. A BIOS of a Phytium ARM platform may perform data communication with a TCM only by modifying an access alignment mode of an LPC (a computer bus).

Based on the above objective, an aspect of the present disclosure provides a method for supporting TCM communication by a BIOS of an ARM server, including:

setting an access mode of an LPC bus device to a 4-byte alignment read-write mode by means of a BIOS of an ARM server;

causing the BIOS to perform data communication with a TCM chip of the LPC bus device in the 4-byte alignment read-write mode;

in response to the BIOS reading a register by means of the LPC bus device, determining a type of the register;

in response to determining that the type of the register is a specific First Input First Output (FIFO) register, changing a control register of the LPC bus device from the 4-byte alignment read-write mode to a single-byte alignment read-write mode, and performing single-byte read-write on the specific FIFO register; and in response to completion of read-write of the specific FIFO register, changing the control register of the LPC bus device to the 4-byte alignment read-write mode by means of the BIOS, and performing a read-write operation on other FIFO registers.

In some implementation modes of the method for supporting TCM communication by a BIOS of an ARM server in the present disclosure, the method further includes:

setting an access address of the LPC bus device accessed by the BIOS of the ARM server to the 4-byte alignment read-write mode by default.

In some implementation modes of the method for supporting TCM communication by a BIOS of an ARM server in the present disclosure, the specific FIFO register is located in a security module of the TCM chip, and does not support the 4-byte alignment read-write mode.

In some implementation modes of the method for supporting TCM communication by a BIOS of an ARM server in the present disclosure, the method further includes:

connecting the TCM chip to the ARM server by means of the LPC bus device.

In some implementation modes of the method for supporting TCM communication by a BIOS of an ARM server in the present disclosure, the step of in response to completion of read-write of the specific FIFO register, changing the control register of the LPC bus device to the 4-byte alignment read-write mode by means of the BIOS and performing the read-write operation on other FIFO registers further includes:

determining a read-write state of the specific FIFO register by means of the BIOS, and in response to determining that read-write of the specific FIFO register is completed, changing the read-write mode to the 4-byte alignment read-write mode by means of the control register.

A further aspect of the embodiments of the present disclosure also provides an apparatus for supporting TCM communication by a BIOS of an ARM server, including:

an access module, configured to set an access mode of an LPC bus device to a 4-byte alignment read-write mode by means of a BIOS of an ARM server;

a communication module, configured to cause the BIOS to perform data communication with a TCM chip of the LPC bus device in the 4-byte alignment read-write mode;

a determination module, configured to, in response to the BIOS reading a register by means of the LPC bus device, determine a type of the register;

a byte modification module, configured to, in response to determining that the type of the register is a specific FIFO register, change a control register of the LPC bus device from the 4-byte alignment read-write mode to a single-byte alignment read-write mode, and perform single-byte read-write on the specific FIFO register; and a recovery module, configured to, in response to completion of read-write of the specific FIFO register, change the control register of the LPC bus device to the 4-byte alignment read-write mode by means of the BIOS, and perform a read-write operation on other FIFO registers.

In some implementation modes of the apparatus for supporting TCM communication by a BIOS of an ARM server in the present disclosure, the apparatus further includes:

a connection module, configured to connect the TCM chip to the ARM server by means of the LPC bus device.

In some implementation modes of the apparatus for supporting TCM communication by a BIOS of an ARM server in the present disclosure, the recovery module is further configured to:

determine a read-write state of the specific FIFO register by means of the BIOS, and in response to determining that read-write of the specific FIFO register is completed, change the read-write mode to the 4-byte alignment read-write mode by means of the control register.

A further aspect of the embodiments of the present disclosure also provides a computer device, including:

at least one processor; and a memory storing a computer program capable of running in the at least one processor. The at least one processor executes the program to execute the method for supporting TCM communication by a BIOS of an ARM server as described above.

A further aspect of the embodiments of the present disclosure also provides a computer-readable storage medium, storing a computer program, the computer program is executed by a processor to execute the method for supporting TCM communication by a BIOS of an ARM server as described above.

The present disclosure has at least the following beneficial technical effects. The system of the present disclosure is high in reproducibility and extensibility, thus a BIOS of a Phytium ARM platform may perform data communication with a TCM only by modifying an access alignment mode of an LPC (a computer bus), meeting requirements of Chinese party and government for security and reliability of information data in computer devices. Therefore, requirements for security of information data in key fields in China are met well, and a powerful guarantee is provided for the development of China's information industry.

BRIEF DESCRIPTION OF THE DRAWINGS

In order to describe the technical solutions in the embodiments of the present disclosure or the prior art more clearly, the drawings required to be used in descriptions about the embodiments or the prior art will be introduced briefly below. Apparently, the drawings in the description below are only some embodiments of the present disclosure. Those ordinarily skilled in the art may further obtain other embodiments according to these drawings without creative work.

DETAILED DESCRIPTION

In order to make the objective, technical solutions, and advantages of the present disclosure clearer, the embodiments of the present disclosure will further be described below in detail in combination with specific embodiments and with reference to the drawings.

It is to be noted that all expressions made with "first", "second", etc., in the embodiments of the present disclosure are for distinguishing two different entities or parameters with the same name, and thus it can be seen that "first" and "second" are only for ease of description and should not be understood as limitations on the embodiments of the present disclosure. No descriptions are made thereto in the following embodiments.

Figure 1:
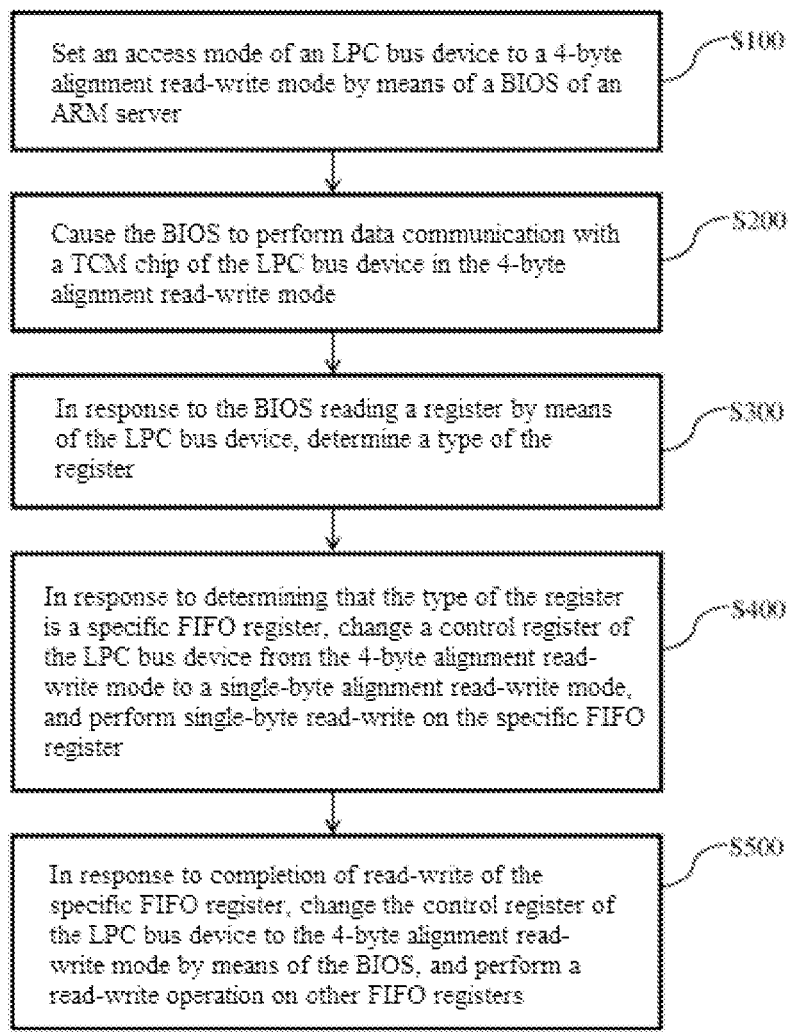
FIG. 1 is a schematic block diagram of an embodiment of a method for supporting TCM communication by a BIOS of an ARM server according to the present disclosure.

Based on the above objective, a first aspect of the embodiments of the present disclosure discloses an embodiment of a method for supporting TCM communication by a BIOS of an ARM server. FIG. 1 is a schematic diagram of an embodiment of a method for supporting TCM communication by a BIOS of an ARM server according to the present disclosure. In the embodiment shown in FIG. 1, the method at least includes the following steps.

In S100, an access mode of an LPC bus device is set to a 4-byte alignment read-write mode by means of a BIOS of an ARM server.

In S200, the BIOS is caused to perform data communication with a TCM chip of the LPC bus device in the 4-byte alignment read-write mode.

In S300, in response to the BIOS reading a register by means of the LPC bus device, a type of the register is determined.

In S400, in response to determining that the type of the register is a specific FIFO register, a control register of the LPC bus device is changed from the 4-byte alignment read-write mode to a single-byte alignment read-write mode, and single-byte read-write is performed on the specific FIFO register.

In S500, in response to completion of read-write of the specific FIFO register, the control register of the LPC bus device is changed to the 4-byte alignment read-write mode by means of the BIOS, and a read-write operation is performed on other FIFO registers.

In some embodiments, a BIOS of a Phytium ARM platform sets an access mode of an LPC bus device to a 4-byte alignment read-write mode. The BIOS of the Phytium ARM platform performs data communication with a TCM chip of the LPC bus in the 4-byte alignment read-write mode. Before the BIOS reads a specific FIFO register of the TCM chip by means of the LPC bus, a control register of the LPC bus is changed from the 4-byte alignment read-write mode to a single-byte alignment read-write mode, and then the BIOS performs single-byte read-write on the specific FIFO register of the TCM chip. After performing single-byte read-write on the specific FIFO register of the TCM chip by means of the LPC bus, the BIOS changes a control register of the LPC bus to the 4-byte alignment read-write mode. The BIOS performs a read-write operation on other FIFO registers after changing the mode of accessing the TCM chip to the 4-byte alignment mode by means of the LPC bus.

According to some implementation modes of the method for supporting TCM communication by a BIOS of an ARM server in the present disclosure, the method further includes the following step:

an access address of the LPC bus device accessed by the BIOS of the ARM server is set to the 4-byte alignment read-write mode by default.

In some embodiments of the present disclosure, when the BIOS of the Phytium ARM accesses the LPC bus device, it is required that an access address is in the 4-byte alignment mode.

In some embodiments, the specific FIFO register is located in a security module of the TCM chip, and does not support the 4-byte alignment read-write mode. Therefore, when the BIOS of the ARM platform accesses the specific FIFO register of the TCM chip by means of the LPC bus, the control register of the LPC bus needs to be set to a single-byte access mode.

According to some implementation modes of the method for supporting TCM communication by a BIOS of an ARM server in the present disclosure, the method further includes the following step:

the TCM chip is connected to the ARM server by means of the LPC bus device.

In some embodiments of the present disclosure, the LPC bus, originally called Low Pin Count bus, is used to connect a low-bandwidth device to a CPU in an IBM PC compatible. The LPC bus has the biggest advantage of needing seven signals only, and is easy to lay out on a crowded modern motherboard. The TCM is connected to a domestic Phytium ARM processor through an LPC bus.

According to some implementation modes of the method for supporting TCM communication by a BIOS of an ARM server in the present disclosure, the step that in response to completion of read-write of the specific FIFO register, the control register of the LPC bus device is changed to the 4-byte alignment read-write mode by means of the BIOS and a read-write operation is performed on other FIFO registers further includes the following step:

a read-write state of the specific FIFO register is determined by means of the BIOS, and in response to determining that read-write of the specific FIFO register is completed, the read-write mode is changed to the 4-byte alignment read-write mode by means of the control register.

In some embodiments of the present disclosure, when the BIOS of the ARM platform accesses the specific FIFO register of the TCM chip by means of the LPC bus, the control register of the LPC bus needs to be set to the single-byte access mode, and after the BIOS ends the access to the specific FIFO register of the TCM chip, the control register of the LPC bus is set to the 4-byte alignment read-write mode. In this way, normal LPC-protocol-based communication between the BIOS of the Phytium ARM platform and the security module of the TCM chip may be ensured.

Figure 2:
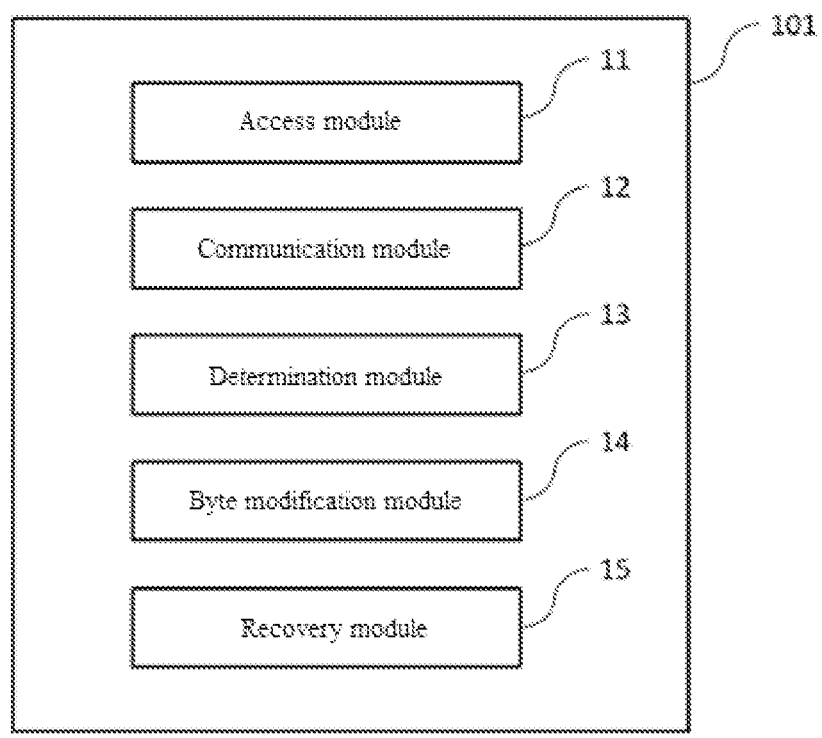
FIG. 2 is a schematic block diagram of an embodiment of an apparatus for supporting TCM communication by a BIOS of an ARM server according to the present disclosure.

A further aspect of the embodiments of the present disclosure discloses an embodiment of an apparatus for supporting TCM communication by a BIOS of an ARM server. FIG. 2 is a schematic block diagram of an embodiment of an apparatus for supporting TCM communication by a BIOS of an ARM server according to the present disclosure. As shown in FIG. 2, the apparatus 101 includes:

an access module 11, configured to set an access mode of an LPC bus device to a 4-byte alignment read-write mode by means of a BIOS of an ARM server;

a communication module 12, configured to cause the BIOS to perform data communication with a TCM chip of the LPC bus device in the 4-byte alignment read-write mode;

a determination module 13, configured to, in response to the BIOS reading a register by means of the LPC bus device, determine a type of the register;

a byte modification module 14, configured to, in response to determining that the type of the register is a specific FIFO register, change a control register of the LPC bus device from the 4-byte alignment read-write mode to a single-byte alignment read-write mode, and perform single-byte read-write on the specific FIFO register; and a recovery module 15, configured to, in response to completion of read-write of the specific FIFO register, change the control register of the LPC bus device to the 4-byte alignment read-write mode by means of the BIOS, and perform a read-write operation on other FIFO registers.

According to some implementation modes of the apparatus for supporting TCM communication by a BIOS of an ARM server in the present disclosure, the apparatus 101 further includes:

a connection module, configured to connect the TCM chip to the ARM server by means of the LPC bus device.

According to some implementation modes of the apparatus for supporting TCM communication by a BIOS of an ARM server in the present disclosure, the recovery module 15 is further configured to:

determine a read-write state of the specific FIFO register by means of the BIOS, and in response to determining that read-write of the specific FIFO register is completed, change the read-write mode to the 4-byte alignment read-write mode by means of the control register.

Based on the above objective, a further aspect of the embodiments of the present disclosure also discloses a computer device, including at least one processor and a memory. The memory stores a computer program executable by the processor. The processor executes the program to execute the method for supporting TCM communication by a BIOS of an ARM server as described above.

A further aspect of the embodiments of the present disclosure also provides a computer-readable storage medium, storing a computer program, characterized in that the computer program is executed by a processor to execute the method for supporting TCM communication by a BIOS of an ARM server as described above.

Similarly, it is to be understood by those skilled in the art that all of the above implementation modes, features, and advantages described for the method for supporting TCM communication by a BIOS of an ARM server according to the present disclosure are also suitable for the apparatus, computer device, and medium according to the present disclosure. For brevity of the present disclosure, repetitions are omitted herein.

It is particularly to be pointed out that the steps in each embodiment of the method and apparatus for supporting TCM communication by a BIOS of an ARM server, the device, and the medium may be mutually intersected, replaced, added, and deleted. Therefore, these reasonable permutations, combinations, and transformations about the method and apparatus for supporting TCM communication by a BIOS of an ARM server, the device, and the medium shall also fall within the scope of protection of the present disclosure, and the scope of protection of the present disclosure should not be limited to the embodiments.

It is finally to be noted that those ordinarily skilled in the art can understand that all or part of the flows in the method of the above-mentioned embodiment may be completed by a computer program by instructing related hardware. The program for the method for supporting TCM communication by a BIOS of an ARM server may be stored in a computer-readable storage medium. When the program is executed, the flows of each method embodiment may be included. The storage medium storing the program may be a magnetic disk, an optical disk, a Read-Only Memory (ROM), a Random Access Memory (RAM), etc. The embodiment of the computer program may have effects the same as or similar to those in any corresponding method embodiment.

In addition, the method disclosed according to the embodiments of the present disclosure may also be implemented as a computer program executed by a processor. The computer program may be stored in a computer-readable storage medium. When the computer program is executed by the processor, the functions defined in the method disclosed in the embodiments of the present disclosure are executed.

Moreover, each method step and system unit may also be implemented by a controller and a computer-readable storage medium configured to store a computer program that enables the controller to implement the steps or functions of the units.

Furthermore, it is to be understood that the computer-readable storage medium (such as a memory) herein may be a volatile memory or a nonvolatile memory, or may include both a volatile memory and a nonvolatile memory. As an example rather than restriction, the nonvolatile memory may include a ROM, a Programmable ROM (PROM), an Electrically PROM (EPROM), an Electrically Erasable PROM (EEPROM), or a flash memory. The volatile memory may include a RAM that may be used as an external cache memory. As an example rather than restriction, the RAM may be obtained in various forms, such as a Synchronous RAM (SRAM), a Dynamic RAM (DRAM), a Synchronous DRAM (SDRAM), a Double Data Rate SDRAM (DDR SDRAM), an Enhanced SDRAM (ESDRAM), a Synchronous Link DRAM (SLDRAM), and a Direct Rambus RAM (DRRAM). The storage device in the disclosed aspect is intended to include, but not limited to, these or other proper types of memories.

It is also understood by those skilled in the art that various exemplary logic blocks, modules, circuits, and algorithm steps described in combination with the disclosure herein may be implemented as electronic hardware, computer software, or a combination thereof. For ease of description about such interchangeability of hardware and software, functions of various schematic components, blocks, modules, circuits, and steps are described generally. Whether these functions are implemented as software or hardware depends on specific applications and design constraints on the whole system. Those skilled in the art may realize the functions for each specific application in various manners, but such realization should not be explained as resulting in departure from the scope disclosed in the embodiment of the present disclosure.

Various exemplary logic blocks, modules, and circuits described in combination with the disclosure herein may be implemented or executed by the following components designed to execute the functions herein: a general-purpose processor, a Digital Signal Processor (DSP), an Application Specific Integrated Circuit (ASIC), a Field-Programmable Gate Array (FPGA) or another programmable logic device, a discrete gate or transistor logic, a discrete hardware component, or any combination thereof. The general-purpose processor may be a microprocessor. Alternatively, the processor may be any conventional processor, controller, microcontroller, or state machine. Alternatively, the processor may be implemented as a combination of computing devices, such as a combination of a DSP and a microprocessor, multiple microprocessors, a combination of one or more microprocessors and a DSP, and/or any other such configuration.

The steps of the method or algorithm described in combination with the disclosure herein may be directly included in hardware, a software module executed by the processor, or a combination thereof. The software module may be located in a RAM, a flash memory, a ROM, an EPROM, an EEPROM, a register, a hard disk, a removable disk, a Compact Disc ROM (CD-ROM), or a storage medium of any other form well known in this art. The storage medium is exemplarily coupled to the processor such that the processor may read information from the storage medium or write information to the storage medium. In an alternative solution, the storage medium may be integrated with the processor. The processor and the storage medium may be located in an ASIC. The ASIC may be located in a user terminal. In an alternative solution, the processor and the storage medium may be located in a user terminal as discrete components.

In one or more exemplary designs, the function may be realized in hardware, software, firmware, or any combination thereof. If being realized in software, the function may be stored in a computer-readable medium or transmitted through the computer-readable medium as one or more instructions or codes. The computer-readable medium includes a computer storage medium and a communication medium. The communication medium includes any medium that helps transmit a computer program from one position to another. The storage medium may be any available medium accessible for a general-purpose or special-purpose computer. As an example rather than restriction, the computer-readable medium may include a RAM, a ROM, an EEPROM, a CD-ROM or another optical disc storage device, a disk storage device or another magnetic storage device, or any other medium available for carrying or storing a needed program code in form of an instruction or a data structure and accessible for a general-purpose or special-purpose computer or a general-purpose or special-purpose processor. In addition, any connection may be referred to as a computer-readable medium as appropriate. For example, if a coaxial cable, a fiber optic cable, a twisted pair, a Digital Subscriber Line (DSL), or a wireless technology like infrared, radio, and microwave is used to send software from a website, a server, or another remote source, the coaxial cable, the fiber optic cable, the twisted pair, the DSL, or the wireless technology like infrared, radio, and microwave is included in the definition of the medium. As used herein, the magnetic disk and the optical disc include a Compact Disc (CD), a laser disc, an optical disc, a Digital Versatile Disc (DVD), a floppy disc, and a blue-ray disc. Generally, the magnetic disk magnetically reproduces data, while the optical disc optically reproduces data using laser. Combinations of the above-mentioned contents should also be included in the scope of the computer-readable medium.

The above is the exemplary embodiment disclosed in the present disclosure. However, it is to be noted that various variations and modifications may be made without departing from the scope defined in the claims and disclosed in the embodiments of the present disclosure. The functions, steps, and/or actions in the method claims according to the disclosed embodiments described herein are not required to be executed in any specific sequence. In addition, the element disclosed in the embodiments of the present disclosure may be described or required in an individual form, but may be understood as a plural form, unless clearly limited to a singular form.

It is to be understood that, as used herein, the singular form "a/an" is intended to include the plural form also, unless exceptional cases are supported clearly in the context. It is also to be understood that "and/or" used herein refers to including any or all possible combinations of one or more than one item that is listed associatively.

The sequence numbers of the embodiments of the present disclosure are only for description and do not represent superiority-inferiority of the embodiments.

It can be understood by those ordinarily skilled in the art that all or part of the steps of the above-mentioned embodiments may be completed by hardware, or by a program by instructing related hardware. The program may be stored in a computer-readable storage medium. The above-mentioned storage medium may be a ROM, a magnetic disk, an optical disk, or the like.

It is to be understood by those ordinarily skilled in the art that discussions about any above embodiment are only exemplary and not intended to imply that the scope (including the claims) disclosed in the embodiments of the present disclosure is limited to these examples. Under the concept of the embodiments of the present disclosure, the above embodiments or technical features in different embodiments may also be combined, and there are many other variations of different aspects of the embodiments of the present disclosure as described above, which are not provided in details for brevity. Therefore, any omissions, modifications, equivalent replacements, improvements, etc., made within the spirit and principle of the embodiments of the present disclosure shall fall within the scope of protection of the embodiments of the present disclosure.

What is claimed is:

1. A method for supporting Trusted Cryptography Module (TCM) communication by a Basic Input Output System (BIOS) of an Advanced Reduced Instruction Set Computer (RISC) Machine (ARM) server, comprising:
    setting an access mode of a Low Pin Count (LPC) bus device to a 4-byte alignment read-write mode by means of a BIOS of an ARM server;
    causing the BIOS to perform data communication with a TCM chip of the LPC bus device in the 4-byte alignment read-write mode;
    in response to the BIOS reading a register by means of the LPC bus device, determining a type of the register;
    in response to determining that the type of the register is a specific First Input First Output (FIFO) register, changing a control register of the LPC bus device from the 4-byte alignment read-write mode to a single-byte alignment read-write mode, and performing single-byte read-write on the specific FIFO register; and
    in response to completion of read-write of the specific FIFO register, changing the control register of the LPC bus device to the 4-byte alignment read-write mode by means of the BIOS, and performing a read-write operation on other FIFO registers.

2. The method for supporting TCM communication by a BIOS of an ARM server according to claim 1, wherein the method further comprises:
    setting an access address of the LPC bus device accessed by the BIOS of the ARM server to the 4-byte alignment read-write mode by default.

3. The method for supporting TCM communication by a BIOS of an ARM server according to claim 1, wherein the specific FIFO register is located in a security module of the TCM chip, and the specific FIFO register does not support the 4-byte alignment read-write mode.

4. The method for supporting TCM communication by a BIOS of an ARM server according to claim 1, wherein the method further comprises:
    connecting the TCM chip to the ARM server by means of the LPC bus device.

5. The method for supporting TCM communication by a BIOS of an ARM server according to claim 1, wherein the step of in response to completion of read-write of the specific FIFO register, changing the control register of the LPC bus device to the 4-byte alignment read-write mode by means of the BIOS and performing the read-write operation on other FIFO registers further comprises:
    determining a read-write state of the specific FIFO register by means of the BIOS, and in response to determining that read-write of the specific FIFO register is completed, changing a read-write mode to the 4-byte alignment read-write mode by means of the control register.

6. A computer device, comprising:
    at least one processor; and
    a memory storing a computer program executable by the at least one processor, wherein the at least one processor, upon execution of the computer program, is configured to:
        set an access mode of a Low Pin Count (LPC) bus device to a 4-byte alignment read-write mode by means of a Basic Input Output System (BIOS) of an Advanced Reduced Instruction Set Computer (RISC) Machine (ARM) server;
        cause the BIOS to perform data communication with a Trusted Cryptography Module (TCM) chip of the LPC bus device in the 4-byte alignment read-write mode;
        in response to the BIOS reading a register by means of the LPC bus device, determine a type of the register;
        in response to determining that the type of the register is a specific First Input First Output (FIFO) register, change a control register of the LPC bus device from the 4-byte alignment read-write mode to a single-byte alignment read-write mode, and perform single-byte read-write on the specific FIFO register; and
        in response to completion of read-write of the specific FIFO register, change the control register of the LPC bus device to the 4-byte alignment read-write mode by means of the BIOS, and perform a read-write operation on other FIFO registers.

7. A non-transitory computer-readable storage medium, storing a computer program executed by a processor, and upon execution by the processor, the computer program is configured to cause the processor to:

set an access mode of a Low Pin Count (LPC) bus device to a 4-byte alignment read-write mode by means of a Basic Input Output System (BIOS) of an Advanced Reduced Instruction Set Computer (RISC) Machine (ARM) server;

cause the BIOS to perform data communication with a TCM chip of the LPC bus device in the 4-byte alignment read-write mode;

in response to the BIOS reading a register by means of the LPC bus device, determine a type of the register;

in response to determining that the type of the register is a specific First Input First Output (FIFO) register, change a control register of the LPC bus device from the 4-byte alignment read-write mode to a single-byte alignment read-write mode, and perform single-byte read-write on the specific FIFO register; and in response to completion of read-write of the specific FIFO register, change the control register of the LPC bus device to the 4-byte alignment read-write mode by means of the BIOS, and perform a read-write operation on other FIFO registers.

8. The method for supporting TCM communication by a BIOS of an ARM server according to claim 3, wherein in response to the BIOS accessing the specific FIFO register of the TCM chip by means of the LPC bus device, the control register of the LPC bus device is required to be set to a single-byte access mode.

9. The method for supporting TCM communication by a BIOS of an ARM server according to claim 4, wherein the LPC bus device connects a low-bandwidth device to a Central Processing Unit (CPU).

10. The computer device according to claim 6, wherein the at least one processor, upon execution of the computer program, is further configured to:
set an access address of the LPC bus device accessed by the BIOS of the ARM server to the 4-byte alignment read-write mode by default.

11. The computer device according to claim 6, wherein the specific FIFO register is located in a security module of the TCM chip, and the specific FIFO register does not support the 4-byte alignment read-write mode.

12. The computer device according to claim 6, wherein the at least one processor, upon execution of the computer program, is further configured to:
connect the TCM chip to the ARM server by means of the LPC bus device.

13. The computer device according to claim 6, wherein the processor, upon execution of the computer program, is further configured to:
determine a read-write state of the specific FIFO register by means of the BIOS, and in response to determining that read-write of the specific FIFO register is completed, change a read-write mode to the 4-byte alignment read-write mode by means of the control register.

14. The computer device according to claim 11, wherein the at least one processor, upon execution of the computer program, is further configured to:
in response to the BIOS accessing the specific FIFO register of the TCM chip by means of the LPC bus device, the control register of the LPC bus device is required to be set to a single-byte access mode.

15. The computer device according to claim 12, wherein the LPC bus device connects a low-bandwidth device to a Central Processing Unit (CPU).

16. The non-transitory computer-readable storage medium according to claim 7, wherein the computer program, upon execution by the processor, is further configured to cause the processor to:
set an access address of the LPC bus device accessed by the BIOS of the ARM server to the 4-byte alignment read-write mode by default.

17. The non-transitory computer-readable storage medium according to claim 7, wherein the specific FIFO register is located in a security module of the TCM chip, and the specific FIFO register does not support the 4-byte alignment read-write mode.

18. The non-transitory computer-readable storage medium according to claim 7, wherein the computer program, upon execution by the processor, is further configured to cause the processor to:
connect the TCM chip to the ARM server by means of the LPC bus device.

19. The non-transitory computer-readable storage medium according to claim 7, wherein the computer program, upon execution by the processor, is further configured to cause the processor to:
determine a read-write state of the specific FIFO register by means of the BIOS, and in response to determining that read-write of the specific FIFO register is completed, change a read-write mode to the 4-byte alignment read-write mode by means of the control register.

20. The non-transitory computer-readable storage medium according to claim 17, wherein the computer program, upon execution by the processor, is further configured to cause the processor to:
in response to the BIOS accessing the specific FIFO register of the TCM chip by means of the LPC bus device, the control register of the LPC bus device is required to be set to a single-byte access mode.

* * * * *